(12) United States Patent
Chandra

(10) Patent No.: US 7,991,293 B2
(45) Date of Patent: Aug. 2, 2011

(54) UNIFIED OPTICAL CONNECTOR ARCHITECTURE

(75) Inventor: Prashant R. Chandra, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 11/965,451

(22) Filed: Dec. 27, 2007

(65) Prior Publication Data
US 2009/0169214 A1 Jul. 2, 2009

(51) Int. Cl.
*H04B 10/00* (2006.01)
*H04J 14/02* (2006.01)

(52) U.S. Cl. .................. 398/128; 398/82; 398/127

(58) Field of Classification Search .......... 398/41, 398/43, 79, 126, 127, 128
See application file for complete search history.

(56) References Cited

U.S. PATENT DOCUMENTS

| | | | |
|---|---|---|---|
| 5,313,323 A | 5/1994 | Patel | |
| 6,226,701 B1* | 5/2001 | Chambers et al. | 710/105 |
| 7,272,277 B2 | 9/2007 | Ruiz | |
| 2002/0063924 A1* | 5/2002 | Kimbrough et al. | 359/125 |
| 2006/0127091 A1* | 6/2006 | Yoo et al. | 398/69 |
| 2006/0165132 A1 | 7/2006 | Chang | |

OTHER PUBLICATIONS

International Search Report and Written Opinion recieved for PCT Application No. PCT/US2008/084638, mailed on Apr. 24, 2009; 11 pages.

* cited by examiner

*Primary Examiner* — Dalzid Singh
(74) *Attorney, Agent, or Firm* — Derek J. Reynolds

(57) ABSTRACT

A system, device, and method are disclosed. In one embodiment the system includes an optical link and a peripheral device optically coupled to the optical link. The system also includes a host controller, such as a graphics, network, or I/O controller. The system also includes a unified optical connector port, which is optically coupled to the optical link and electrically coupled to the first host controller. The port has a wavelength allocation unit that can allocate an optical wavelength for an optical signal that is utilized to communicate with the peripheral device. The port also includes an electrical-to-optical transmission unit capable of converting an electrical signal, received from the host controller, to the optical signal that was allocated at the first optical wavelength. The electrical-to-optical transmission unit is also capable of transmitting one or more data packets within the first optical signal to the peripheral device across the optical link.

21 Claims, 6 Drawing Sheets

UNIFIED OPTICAL CONNECTOR ARCHITECTURE

FIELD OF THE INVENTION

The invention relates to the implementation of a unified optical connector architecture across a computer system.

BACKGROUND OF THE INVENTION

Current computer platform architecture has a variety of host controllers to implement a number of different types of I/O between computer platforms and peripherals that are connected to the platforms. For example, a graphics host controller potentially has analog and digital ports with corresponding connection interfaces (i.e. the plugs at the ends of the cables connecting a display device to a computer platform. Local area network controllers within the platform commonly have one or more Ethernet jacks. The Universal Serial Bus (USB) subsystem has a number of associated USB plug interfaces. IEEE 1394 Firewire also may have one or more plug interfaces. The list of separate and distinct ports and the associated hardware interfaces to plug peripherals into a computer platform go on and on. Computer platforms with all of these interfaces and corresponding hardware jacks/plugs have a significant requirement for large amount of motherboard and case real estate to get all of this hardware in one spot. This has limited the ability for mobile computers to have a full complement of these interfaces and the rear peripheral interface panel on many desktop systems has unfortunately grown in size as well.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a system, device, and method to implement a unified optical connector architecture on a computer platform are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
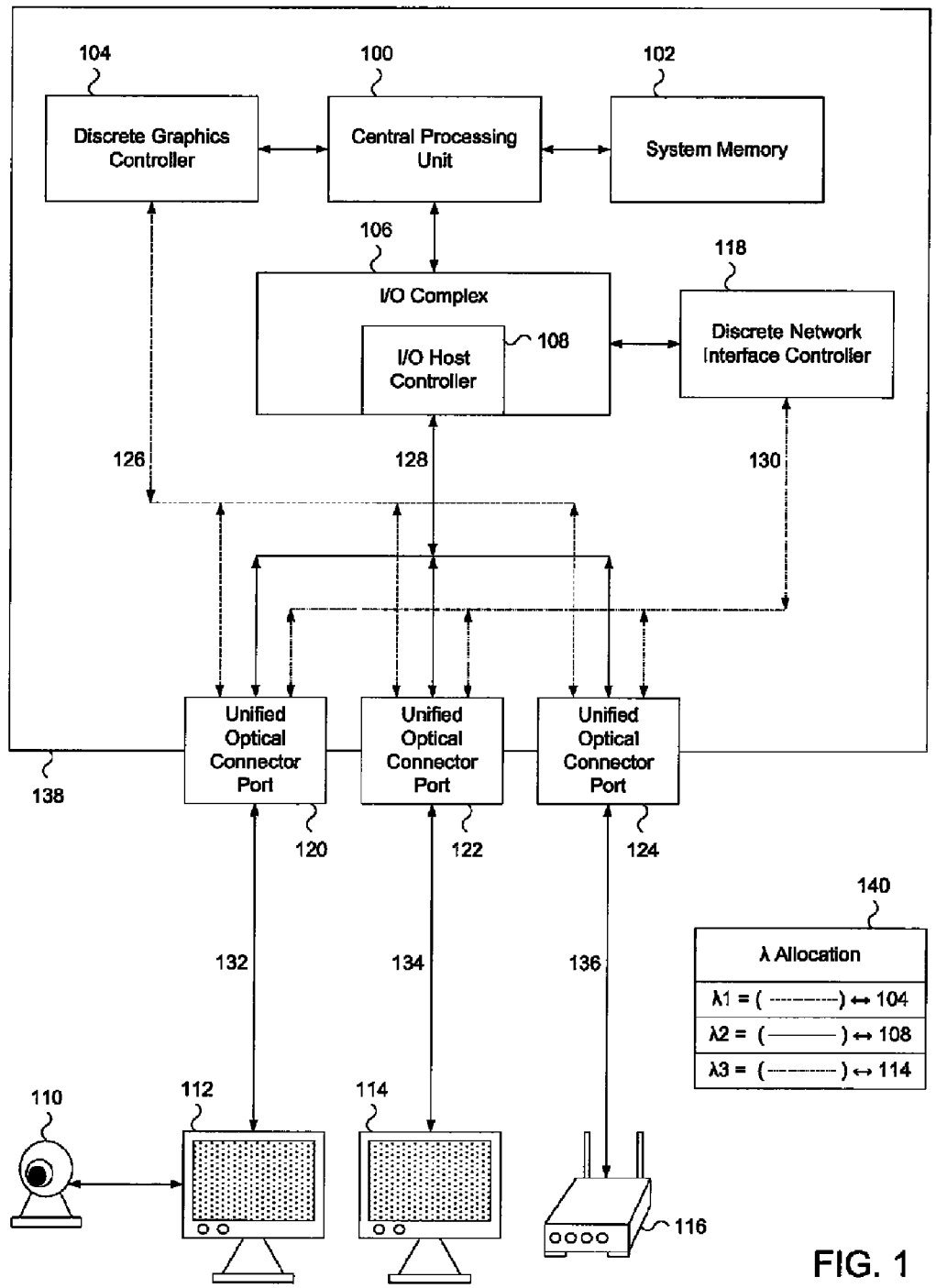
FIG. 1 describes one embodiment of a system-level implementation of a unified optical connector architecture.

FIG. 1 describes one embodiment of a system-level implementation of a unified optical connector architecture. In many embodiments, the system includes one or more processors, such as central processing unit (CPU) 100. In different embodiments, CPU 100 may include one core or multiple cores. In some embodiments, the system is a multiprocessor system (not shown) where each of the processors has one core or multiple cores.

CPU 100 is coupled to system memory 102 through one or more high speed links (i.e. interconnects, buses, etc). System memory 102 is capable of storing information that CPU 100 utilizes to operate and execute programs and operating systems. In different embodiments, system memory 102 may be any usable type of readable and writeable memory such as a form of dynamic random access memory (DRAM).

In some embodiments, CPU 100 is also coupled to a discrete graphics controller 104 through an additional high speed link. The discrete graphics controller 104 may be physically coupled to a motherboard or other such printed circuit board through a slot connector. In many embodiments, the discrete graphics controller may be a PCI Express® graphics controller/card that is plugged into a PCI Express® graphics slot connector. In this case, the PCI Express® graphics controller/card may be compliant with a revision of the specification such as PCI Express® Base Specification, Rev. 2.0, published on Dec. 20, 2006. In other embodiments, the discrete graphics controller utilizes a protocol other than PCI Express®. In some embodiments, CPU 100 is coupled to multiple discrete graphics controllers (embodiments with multiple discrete graphics controllers are not shown).

CPU 100 is also coupled to I/O complex 106, in many embodiments. I/O complex 106 may house one or more I/O host controllers, such as I/O host controller 108. Each I/O host controller controls one or more I/O links that allow CPU 100 to communicate with I/O peripherals attached to the computer system. For example, I/O host controller 108 may be a Universal Serial Bus (USB) host controller compliant with revision 2.0 of the USB specification, published on Apr. 27, 2000. I/O peripherals such as web camera 110, display 112, display 114, and wireless router 116 are examples of I/O peripherals that may be attached to the computer system.

I/O complex 106 is coupled to a discrete network interface controller (NIC) 118, in many embodiments. Discrete NIC 118 is capable of providing an interface between the computer system and one or more networks external to the computer system. These networks may include networks such as wireless and wired intranet networks within a domain that the computer is located within or they may also include the Internet itself.

In many embodiments, the system in FIG. 1 includes one or more unified optical connector (UOC) ports, such as ports 120, 122, and 124. In many embodiments, an electrical link (i.e. one or more wires that an electrical signal can be transmitted across) couples each UOC port with each host controller in the computer system. For example, in FIG. 1, a graphics host controller (104), a network host controller (118), and an I/O host controller (108) are present in the computer system.

Thus, in many embodiments, electrical link 126 is a medium for transmitting an electrical signal comprising graphics data between graphics controller 104 and each of UOC ports 120, 122, and 124. Also, electrical link 128 is a medium for transmitting an electrical signal comprising network data between network controller 118 and each of UOC ports 120, 122, and 124. Finally, electrical link 130 is a medium for transmitting an electrical signal comprising I/O data between the I/O host controller 108 and each of UOC ports 120, 122, and 124. There may be more host controllers and UOC ports present in the system, but the embodiment shown in FIG. 3 utilizes three controllers and three ports. Thus, in the embodiment shown, each UOC port is coupled to every host controller in the computer system that potentially requires interaction with one or more peripheral devices plugged into the computer system.

In many embodiments, each UOC port is also coupled to an optical link comprising one or more optical fibers capable of transporting an optical signal from one end of the link to the other end of the link. E.g., in FIG. 1, optical link 132 is coupled to UOC port 120, optical link 134 is coupled to UOC port 122, and optical link 136 is coupled to UOC port 124. In many embodiments, each optical link utilizes wavelength division multiplexing technology, thus there may be more than one optical signal being simultaneously transmitted across each optical link.

In some embodiments, each UOC port includes additional logic that is capable of converting an electrical signal to a corresponding optical signal and vice versa and then transmitting the converted signal onto the alternate medium link. For example, webcam 110, though not coupled directly to optical link 132, is coupled to display 112, which in turn is coupled to optical link 132. Webcam 110 may require communicating with the I/O host controller 108 and display 112 may require communicating with display host controller 104.

A first communication (e.g. one or more data packets) originating from the graphics controller 104 and targeting display 112 is initially electrically transmitted as an electrical signal across electrical link 126, which reaches UOC port 120. UOC port 120 then converts the first communication to an optical signal and transmits the optical signal across optical link 132 to display 112. In this example, at the same time the first communication is taking place, I/O host controller 108 generates a second communication targeting webcam 110. This second communication is initially electrically transmitted as an electrical signal across electrical link 128, which also reaches UOC port 120. UOC port 120 then converts the second communication to an optical signal and transmits the optical signal across optical link 132 to display 112, (the display then either lets the communication simply pass through to webcam 110 or retransmits the communication to webcam 110 itself).

In many embodiments, the first communication from graphics controller 104 and the second communication from I/O host controller 108 are transmitted across optical link 132 simultaneously using wavelength division multiplexing logic within UOC port 120. This logic multiplexes the two converted optical signals together and transmits the multiplexed signal. The multiplexed signal then reaches display 112 and display 112 then demultiplexes the optical signal into the two separate communications, the first communication being received by the display 112 and the second communication being passed through to the webcam 110 where it is then received.

Additional logic within each of the UOC ports allows for the opposite conversion to take place. For example, webcam 110 and display 112 both send simultaneous communications to the I/O host controller 108 and graphics controller 104, respectively. Webcam 110 initially sends a signal to display 112. This signal may be electrical or optical in different embodiments. If the signal is electrical, then logic within display 112 converts the webcam transmission to an optical signal. If the signal originating from the webcam is optical, then no conversion is required. After both the webcam and display optical signals have been generated, additional logic within the display (e.g. potentially each device has a UOC port with all internal logic identical or similar per port) multiplexes the two optical signals and transmits the multiplexed signal to UOC port 120.

After receiving the multiplexed signal, UOC port 120 demultiplexes the signal into two separate optical signals. UOC port then converts each of the two optical signals into corresponding electrical signals carrying the communications from the webcam 110 and display 112. Finally, the converted electrical signals are transmitted across electrical links 126 and 128, respectively, where they reach their targets (i.e. the display controller 104 and I/O host controller 108).

UOC ports 122 and 124 perform similar conversions and transmissions between one or more host controllers in the computer system 138 and one or more peripheral devices using optical link 132, 134, and/or 136.

In wavelength division multiplexing, a single optical link may carry multiple optical signals simultaneously where each of the optical signals is transmitted at a different (i.e. unique) wavelength from all other optical signals being transmitted. In many embodiments, each electrical signal corresponding to a host controller can be allocated a specific wavelength of light for transmission across one or more of the optical links (132-136). Wavelength allocation table 140 shows an example of the wavelength allocations. The electrical signal transmitted and received by graphics controller 104 across electrical link 126 is allocated light wavelength 1 ($\lambda 1$), the electrical signal transmitted and received by I/O host controller 108 across electrical link 128 is allocated light wavelength 2 ($\lambda 2$), and the electrical signal transmitted and received by network controller 114 across electrical link 130 is allocated light wavelength 3 ($\lambda 3$). In some embodiments, wavelength allocation per controller may take place at system boot.

Figure 2:
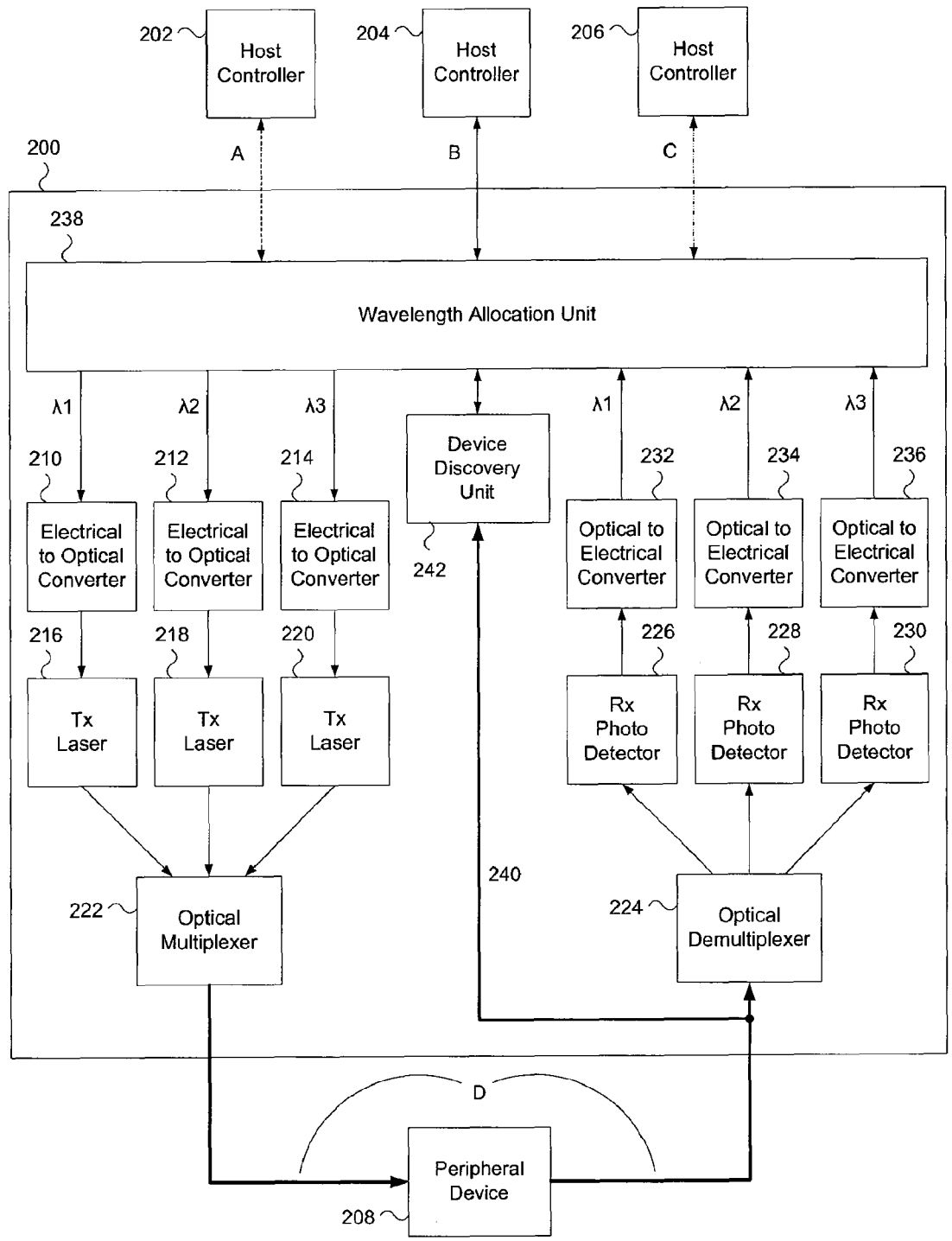
FIG. 2 describes an embodiment of the conversion and transmission logic within a unified optical connector port.

FIG. 2 describes an embodiment of the conversion and transmission logic within a unified optical connector port. In many embodiments, a UOC port 200 is electrically coupled to host controllers 202, 204, and 206, which refers to an electrical link (i.e. interconnect, bus) physically connecting a host controller to the UOC port 200. For example, host controller 202 is electrically coupled to UOC port 200 by link A.

Additionally, UOC port 200 is optically coupled to peripheral device 208 by optical link D. In many embodiments, such as the embodiment shown in FIG. 2, optical link D has two separate optical fibers, one fiber is the medium for communications transmitted from the UOC port 200 to the peripheral device 208, and a second fiber is the medium for communications transmitted from the peripheral device 208 to UOC port 200. Optical link D also may include one or more electrical wires used for powering the peripheral, etc.

A host controller, such as host controller 202, may initiate a communication with the peripheral device 208. This communication begins with a host controller, for example host controller 202, transmitting an electrical signal (carrying information such as one or more data packets) across electrical link A to UOC port 200. UOC port 200 receives the electrical signal from electrical link A at a wavelength allocation unit 238. The wavelength allocation unit allocates an optical signal wavelength that is not already in use and binds that wavelength to the electrical signal received from host controller 202. Each wavelength has a dedicated electrical-to-optical converter (210, 212, and 214) as well as a corresponding transmission (Tx) laser (216, 218, and 220). Thus, although FIG. 2 shows only three pairs of electrical-to-optical converters and corresponding Tx lasers, in many embodiments, the implementation of a UOC port would include as many pairs of electrical-to-optical converters and corresponding Tx lasers as there are wavelengths to allocate. For example, in a workstation computer system with four displays, one network connection, and eight USB ports, there may be a total of six wavelengths to allocate (four for display, one for network, and one shared by the eight USB ports).

Returning to FIG. 2, once an optical wavelength is allocated to a specific electrical signal from an electrical link, then the wavelength allocation unit 238 routes the electrical signal to the specific electrical-to-optical converter which converts to an optical signal at that wavelength. For example, wavelength allocation unit may allocate wavelength 1 ($\lambda 1$) to electrical signal A. In many embodiments, wavelength allocation unit 238 will then route the electrical signal A traffic (i.e the data packet(s) that are being transported within electrical signal A) to the $\lambda 1$ logic. Thus, electrical-to-optical converter unit 210 and converts the signal to an optical signal (i.e. a light wave of the allocated wavelength), which is then transmitted by Tx laser 216 to optical multiplexer 222.

Optical multiplexer 222 utilizes wavelength division multiplexing technology to multiplex two or more optical transmission signals if necessary. In this example only the optically-converted signal originating from host controller 202 is utilized, so no multiplexing of multiple optical signals is required. Although, in other embodiments the electrical signals of host controller 204 and/or host controller 206 are also received. Thus the additional signal(s) are then converted to optical signals additional wavelengths (such as $\lambda 2$ and $\lambda 3$) using the electrical-to-optical converter units (212 and/or 214) and then transmitted to the optical multiplexer 222 using Tx laser units (218 and/or 220), respectively. In embodiments where multiple wavelengths are utilized, optical multiplexer combines the multiple wavelengths into a single signal that is then transmitted across optical link D to the peripheral device 208.

FIG. 2 also describes the return path of communication (i.e. a communication signal path originating at the peripheral device 208 with a target destination of one or more of the host controllers (202-206). This communication begins with peripheral device 208 transmitting an optical signal (carrying information such as one or more data packets) across optical link D to UOC port 200. This optical signal may be multiplexed if the peripheral device has wavelength division multiplexing technology to accomplish the multiplexing. UOC port 200 receives the optical signal at optical demultiplexer 224.

Optical demultiplexer 224 separates out each individual optical signal from the multiplexed signal. For example, peripheral device 208 may have sent two optical signals, a first optical signal targeting host controller 202 and a second optical signal targeting host controller 204. Each optical signal of a specific wavelength is sent to a specific reception (Rx) photo detector unit. In this example, the optical signal targeting host controller 202 is using wavelength $\lambda 1$, thus it is sent to Rx photo detector 226. Also, the optical signal targeting host controller 204 is using wavelength $\lambda 2$, thus it is sent to Rx photo detector 228. The Rx photo detector units feed the detection information to their corresponding optical-to-electrical converter units. In this example, optical-to-electrical converter units 232 and 234 receive the information. Each optical-to-electrical converter unit then converts the optical signal it receives to a corresponding electrical signal.

The converted electrical signal is then sent to wavelength allocation unit 238, which maintains the wavelength allocation information. Thus, wavelength allocation unit 238 is aware that the electrical signal it receives from optical-to-electrical converter 232 corresponds to wavelength $\lambda 1$ and the unit can route this electrical signal accordingly to host controller 202 across electrical signal link A. Additionally, wavelength allocation unit 238 is aware that the electrical signal it receives from optical-to-electrical converter 234 corresponds to wavelength $\lambda 2$ and the unit can route this electrical signal accordingly to host controller 204 across electrical signal link B.

In additional embodiments, peripheral device 208 may send an optical signal targeting host controller 206. In these embodiments, once this optical signal is separated from the other optical signals at optical demultiplexer 224, Rx photo detector unit 230 and optical-to-electrical converter unit 236 are both utilized to receive the optical signal, convert the optical signal to an electrical signal, and transmit the electrical signal the wavelength allocation unit, which then routes the electrical signal accordingly to host controller 206 across electrical link C.

In many embodiments, a native device discovery protocol is utilized. In some embodiments, optical link D may additionally include one or more electrical wires utilized to detect the presence of a device coupled to the optical link. When one or more electrical wires are present to aid in detection, they may be split off of the link upon entering UOC port 200 and routed along electrical link 240 to a device discovery unit 242. The device discovery unit may assist in the discovery process by discovering the peripheral device 208 coupled to link D.

In many embodiments, the wavelength allocation unit is capable of powering down the transmission, detection, and conversion units for a specific wavelengths that are not utilized. The control lines associated with this implementation are not shown in FIG. 2, although they would simply comprise control lines to each unit associated with a particular wavelength that control the power source supplying power to the logic enclosed within the electrical-to-optical converter, the optical-to-electrical converter, the Tx laser, and the Rx photo detector units associated with a wavelength.

For example, if host controller 202 is communicating with peripheral device 208 through UOC port 200 and the only means of communication is a single signal that is allocated to wavelength $\lambda 1$, then wavelength allocation unit may shut down all logical units associated with wavelengths $\lambda 2$ and $\lambda 3$ (i.e. units 212, 214, 218, 220, 228, 230, 234, and 236).

In other embodiments, only a portion of these units are shut down, depending on the length of time of inactivity as well as the length of time required to power up a given unit (i.e. if a unit has a significant latency between being powered up and when the unit is fully functional, that unit might remain on, or at least remain on for a longer period of time after it has gone idle with no workload.

In many embodiments, if no peripheral device is attached, all logic units within UOC port 200 that are associated specifically with a given wavelength are powered down (i.e. all electrical-to-optical converters, all optical-to-electrical converters, all Tx lasers, and all Rx photo detectors). In other embodiments, some or all of these units are not entirely powered down, but rather powered into a reduced power mode.

In many embodiments where some or all of the above mentioned units are powered down when no peripheral device is detected, the device discovery unit 242 remains fully operational. The fully operational device discovery unit 242 will monitor link D for activity from a peripheral device plug-in event. Once the device discovery unit 242 sees this activity, it may inform the wavelength allocation unit to wake up one or more sets of units corresponding to one or more wavelengths.

Once the peripheral device has been discovered, a device enumeration process is initiated. Device enumeration may utilize logic within the wavelength allocation unit 238, with the device discovery unit 242, or within other logic in the computer system.

Figure 3:
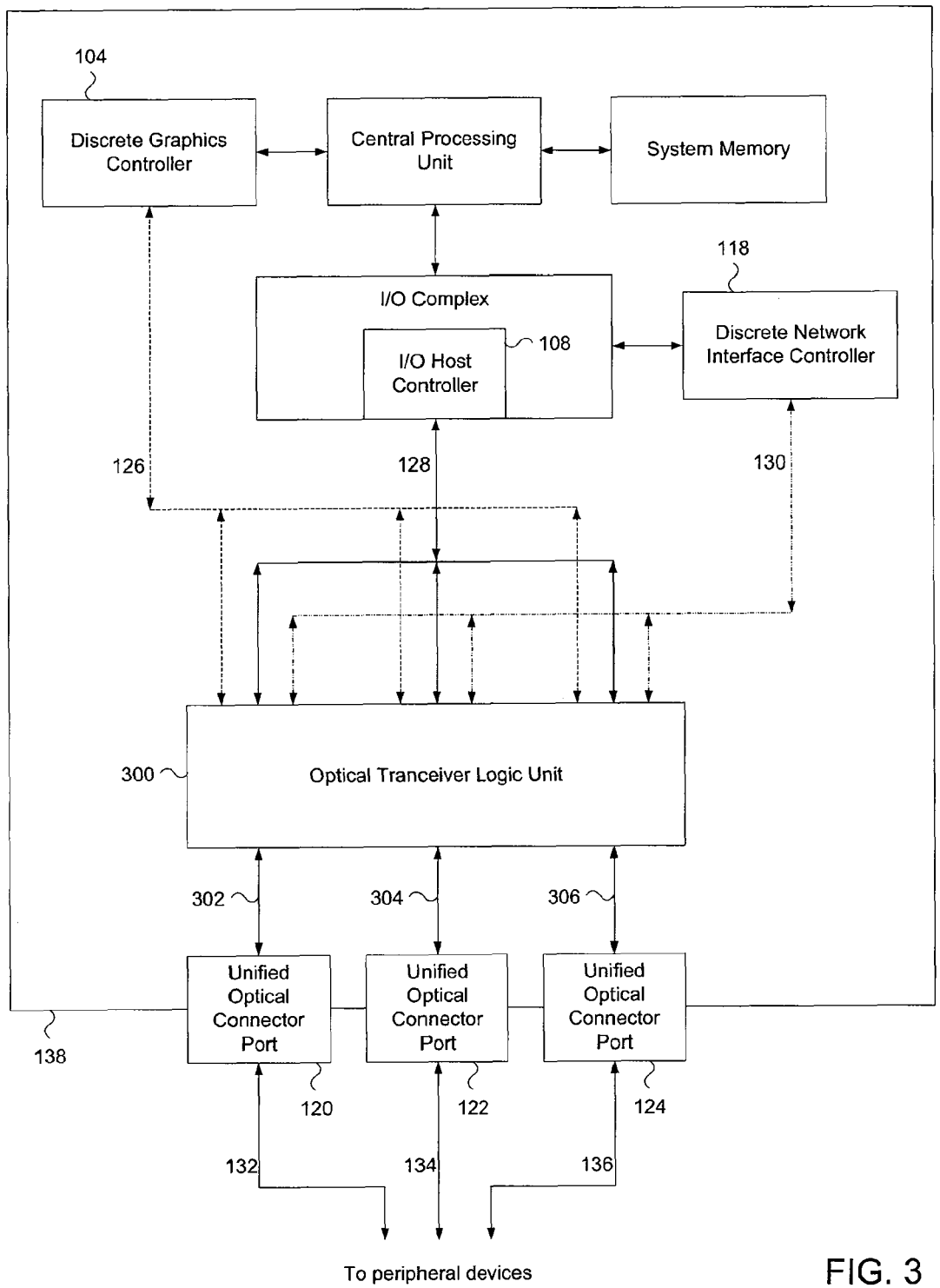
FIG. 3 describes another embodiment of a system-level implementation of a unified optical connector architecture.

FIG. 3 describes another embodiment of a system-level implementation of a unified optical connector architecture. In many other embodiments, all logic within the UOC port (port 200 from FIG. 2) is removed from the UOC port and placed into an optical transceiver logic unit 300 coupled to the one or more host controllers in the computer system (e.g. host controllers 104, 108, and 118). The optical transceiver logic unit 300 may be located in a central location on the motherboard 138 or adjacent to one or more host controllers on the computer system motherboard 138. In many embodiments, the optical transceiver logic unit is coupled to host controllers 104, 108, and 118 through electrical links 126, 128, and 130, respectively.

In these embodiments, all of the work performed by the logic within the UOC port discussed above in reference to FIG. 2 is instead performed much closer to the host controller (s) in question and an optical link is routed on the motherboard from the optical transceiver logic unit 300 to the UOC port(s). These optical links (links 302, 304, and 306) couple the optical transceiver logic unit 300 to UOC ports 120, 122, and 124, respectively.

In these embodiments, the actual UOC ports have no logic within them and only act as a physical connector of the internal optical link (optical links 302, 304, and 306) routed on the motherboard to the external optical link plugged into the port (optical links 132, 134, and 136).

In some embodiments, the optical transceiver logic unit 300 includes transmission, reception, and conversion logic for every host controller. In other embodiments (not shown), there may be an optical transceiver logic unit per host controller (adjacent to each host controller). In yet other embodiments (not shown), there may be a logic unit with the transmission, reception, and conversion logic integrated into each host controller.

Figure 4:
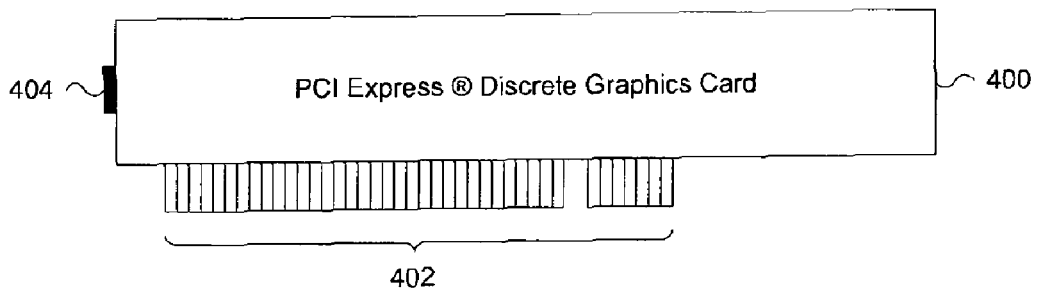
FIG. 4 describes an embodiment of the unified optical connector architecture slot connector for discrete graphics and local area network (LAN) cards.
Figure 4:
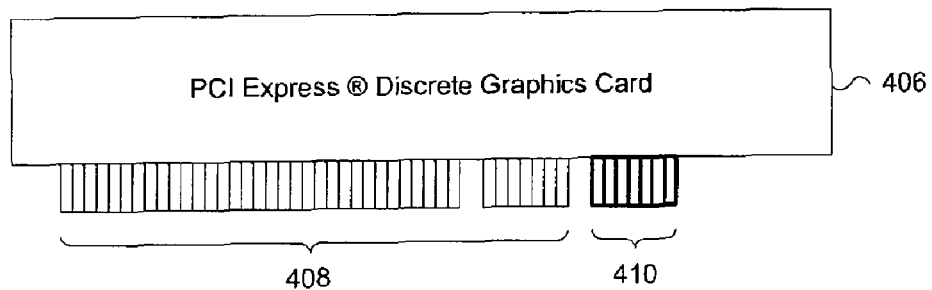
Figure 4:
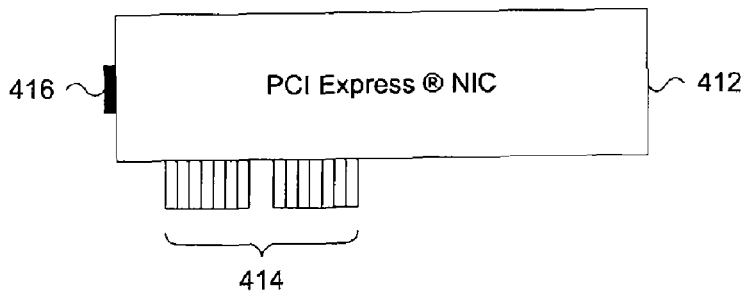
Figure 4:
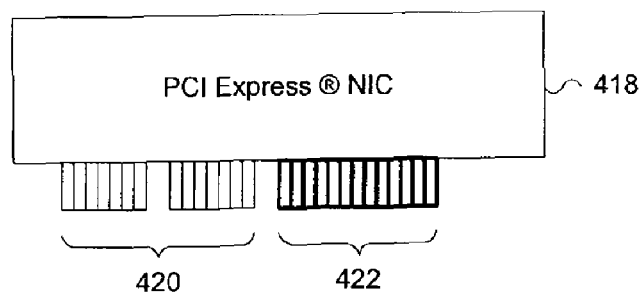

FIG. 4 describes an embodiment of the unified optical connector architecture slot connector for discrete graphics and local area network (LAN) cards. To illustrate the modifications to current discrete graphics and LAN cards, FIG. 4 shows a current version of each card side-by-side with a unified optical connector architecture (UOCA) version of each card. The examples shown in FIG. 4 utilize PCI Express®, though any other relevant protocol may be used.

A current version of a PCI Express® discrete graphics card 400 is shown. Graphics card 400 includes a slot connector pins 402 as shown. Additionally, graphics card 400 has an external display peripheral connector 404. In current PCI Express® discrete graphics scenarios, data from the CPU and system memory is sent to the graphics card 400 across a PCI Express® link that is physically coupled to slot connector pins 402 when graphics card 400 is plugged into the PCI Express® graphics card slot on the computer system motherboard. The graphics card 400 then operates on this received data and sends it to a display peripheral plugged into external display peripheral connector 404.

Turning now to the discrete graphics card with UOCA 406, in the embodiment shown in FIG. 4, a UOCA-capable graphics card 406 includes the slot connector pins 408, similar to the current version graphics card 400. Although, instead of having an external display peripheral connector, the discrete graphics card with UOCA 406 has extra slot connector pins 410. Once the discrete graphics card with UOCA 406 has received data from the PCI Express® link (from slot connector pins 408) and has operated on the received data, the UOCA-capable graphics card 406 sends the data to a display peripheral plugged into a UOC port on the motherboard. Specifically, the data is sent across additional PCI Express® link lanes are routed from the slot connector to the UOC port in the computer system (this is shown as link 126 in FIG. 1). These additional link lanes are physically coupled to the extra slot connector pins 410.

Next, FIG. 4 shows a current version of a PCI Express® discrete LAN card 412 (which has a NIC integrated on the card). LAN card 412 includes slot connector pins 414 as shown. Additionally, LAN card 412 has an external LAN/Ethernet connector 416. In current PCI Express® discrete LAN card scenarios, data from the CPU and system memory is sent to the LAN card 412 across a PCI Express® link that is physically coupled to slot connector pins 414 when LAN card 412 is plugged into a PCI Express® LAN card slot on the computer system motherboard. The LAN card 412 then packetizes this received data and sends it across the network that LAN/Ethernet connector 416 is plugged into.

Finally, turning now to the discrete LAN card with UOCA 418, in the embodiment shown in FIG. 4, a UOCA-capable LAN card 418 includes the slot connector pins 420, similar to the current version LAN card 412. Although, instead of having an external LAN/Ethernet connector, the discrete LAN card with UOCA 418 has extra slot connector pins 410. Once the discrete LAN card with UOCA 412 has received data from the PCI Express® link (from slot connector pins 420) and has packetized the received data, the UOCA-capable LAN card 418 sends the data to an Ethernet cable plugged into a UOC port on the motherboard. Specifically, the data sent across additional PCI Express® link lanes are routed from the slot connector to the UOC port in the system (this is shown as link 130 in FIG. 1). These additional link lanes are physically coupled to the extra slot connector pins 422.

Figure 5:
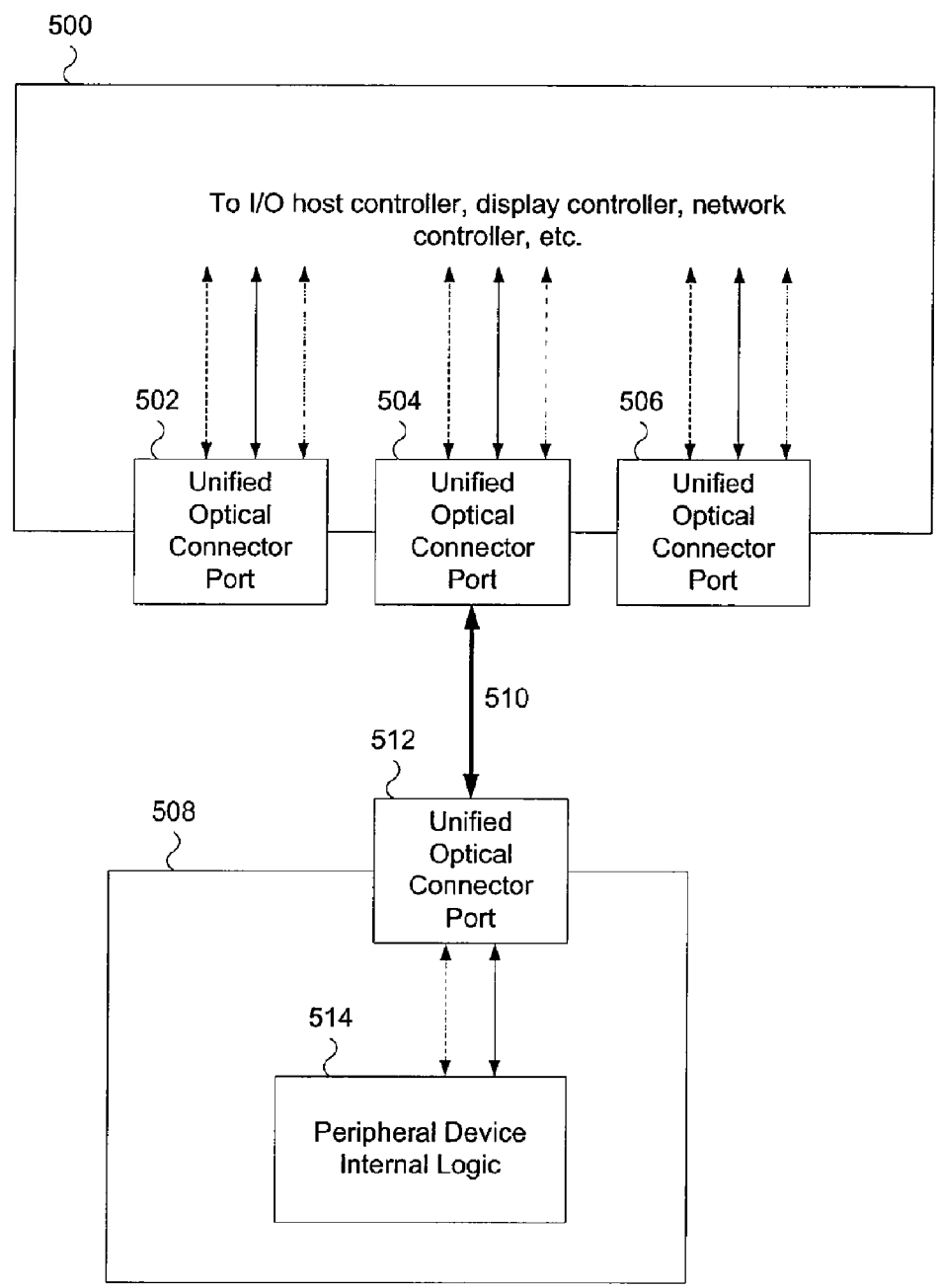
FIG. 5 describes one embodiment of the unified optical connector architecture extended into a peripheral device.

FIG. 5 describes one embodiment of the unified optical connector architecture extended into a peripheral device. In many embodiments, the computer system 500 employing the unified optical connector architecture includes all of the specific components described in FIGS. 1-4. Specifically, at least one UOC port is present and is coupled to one or more host controllers (including potentially I/O host controllers, display controllers, network controllers, etc). The example shows three UOC ports (502, 504, and 506), although on many computer systems/platforms, 4, 6, 8 or more UOC ports will exist on the platform.

In many embodiments, a peripheral device 508 is coupled to the computer system 500 through an optical cable 510 plugged into universal connector port 504. On the peripheral device 508 side, optical cable 510 is plugged into universal connector port 512, which may have an identical form factor as universal connector port 504. The UOC port 512 in peripheral device 508 includes one or more sets of transmission, reception, and conversion logic units as described in FIG. 2 (i.e. a set includes an electrical-to-optical converter, an optical-to-electrical converter, a Tx laser, and a Rx photo detector).

In many embodiments, each port (on both the peripheral device as well as on the computer system) includes a full complement of sets of the above referenced logic for multiple wavelengths. For example, there may be a settled-upon standard number of wavelengths that each port can utilize, thus each port would have the logic associated with sending and receiving optical signals at any of the standard wavelengths. In the embodiments where each port can utilize a standard set of wavelengths, the device may be plugged into the computer system, the device discovery unit (242 in FIG. 2) may discover the device, and then the wavelength allocation unit (238 in FIG. 2) may send an optical handshake signal at the allocated wavelength, which peripheral device 508 receives and then begins further transmissions at the received wavelength. Thus, in many embodiments, the UOC port on the peripheral device is adaptable to the wavelength allocated to it.

In many other embodiments, a specific type of peripheral device (such as a USB device) is pre-allocated a standard wavelength (or subset of standard wavelengths) that is used for all USB devices. In these embodiments, the peripheral device UOC port only has logic associated with the wavelength(s) that its class of device has been allocated as a standard. In the example in FIG. 2, peripheral device 508 is allocated two wavelengths, which it uses to communicate with two host controllers located in computer system 500. These two wavelengths are transmitted and received across optical link 510 by the UOC port 512 on the peripheral device 508. As mentioned, the UOC port 512 on the peripheral device 508 includes all logic devices associated with the allocated wavelength(s), they are set up in the same configuration as what is shown in the UOC port discussed in detail in FIG. 2. Additionally, the UOC port 512 on the peripheral device 508 also includes an optical multiplexer and demultiplexer (the same as shown in the UOC port in FIG. 2).

Thus, during operation, he UOC port 512 on the peripheral device 508 receives a multiplexed optical signal from computer system 500 across optical link 510. Logic within UOC port 512 then demultiplexes the optical signal, converts each of the separate resulting optical signals into their electrical counterparts, and transmits the electrical signals to internal logic 514 within the peripheral device. The internal logic can also send one or more electrical signals to UOC port 512. The electrical signals sent to UOC port 512 are then converted to optical signals. If there are multiple optical signals, then they are combined in the multiplexer. Then the multiplexed optical signal is then transmitted across optical link 510 UOC port 504 on computer system 500.

Figure 6:
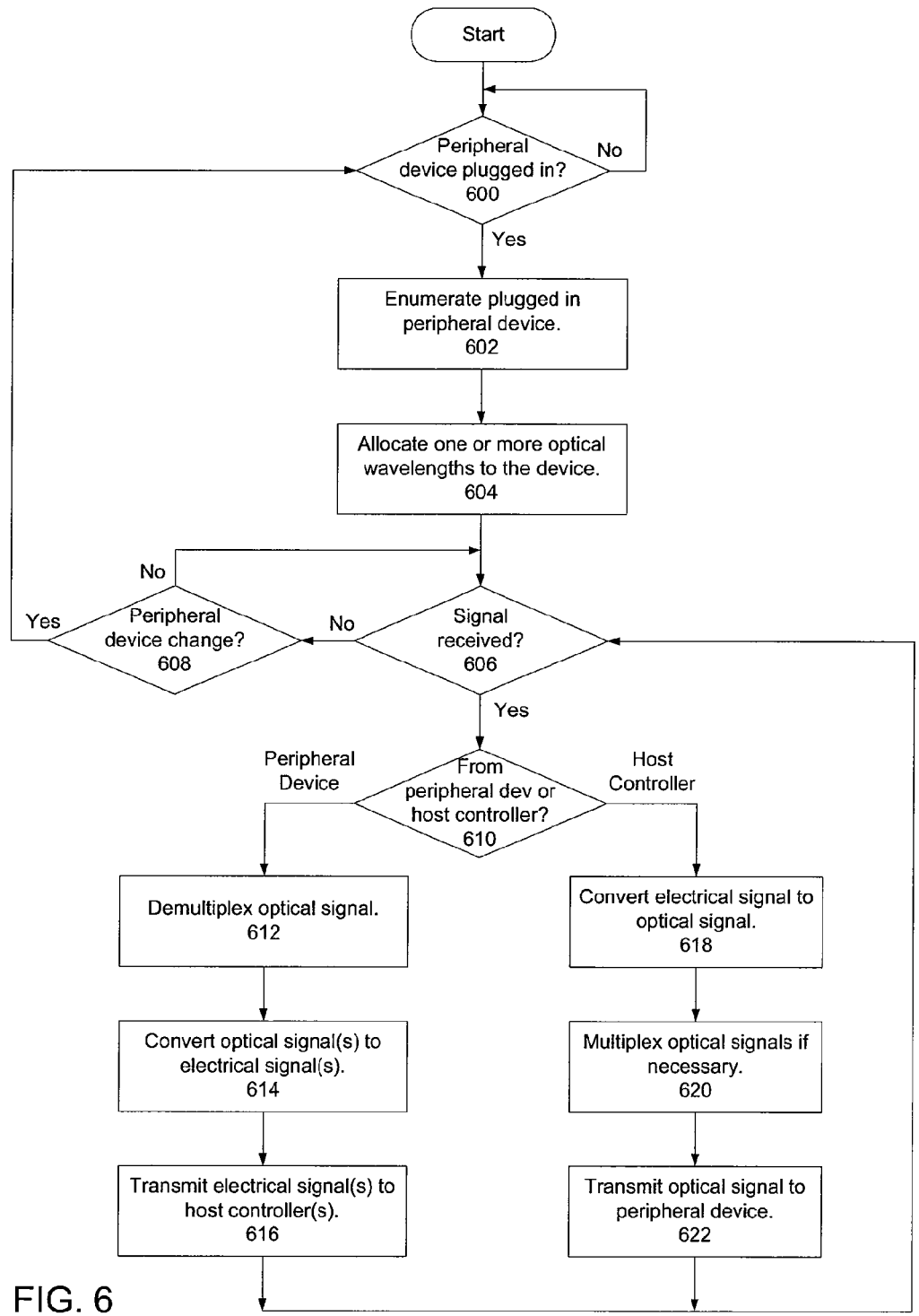
FIG. 6 is a flow diagram of one embodiment of a process to route data packets in a unified optical connector architecture environment.

FIG. 6 is a flow diagram of one embodiment of a process to route data packets in a unified optical connector architecture environment. The process may be performed by hardware, software, or a combination of both. Turning now to FIG. 6, the process begins by processing logic determining whether a peripheral device has been plugged into a unified optical connector port (processing block 600). "Plugging in" refers to the peripheral device being coupled or connected to the unified optical connector port. In different embodiments, the "plugging in" can occur at any time, such as prior to boot or during full system operation when hot-plugging is allowed. If no peripheral device has been plugged, then in processing block 600 repeats (i.e the unified optical connector port is polled—either continuously or a polling can occur once every set period of time).

Next, once processing logic has detected that the device has been plugged in, processing logic then enumerates the peripheral device (processing block 602). Then processing logic allocates one or more optical wavelengths to the peripheral device (processing block 604).

After the allocation, processing logic determines whether a signal has been received (processing block 606). If a signal has not been received, processing logic determines whether there has been a change/modification in the peripheral device (processing block 608). For example, a first peripheral device has been unplugged and a second peripheral device has been plugged into the same unified optical connector port. If there is no change in the status of the peripheral device, processing logic returns to processing block 606 and again checks if a signal (containing data/data packets) has been received. Otherwise, if a change has been detected with the peripheral device, then processing logic returns to processing block 600 to recheck if a peripheral device is plugged into the unified optical connector port.

Returning to processing block 606, if a signal has been received, processing logic determines whether the signal has been received from the peripheral device or the host controller (processing block 610). If the signal has been received from the peripheral device, then the signal is an optical signal of a certain wavelength. Processing logic then proceeds to demultiplex the optical signal (processing block 612) if necessary (i.e. if there are multiple optical signals multiplexed into one combined optical signal). Next, processing logic converts the optical signal or signals (depending on if the original signal was multiplexed) into a corresponding electrical signal per optical signal (processing block 614). Then processing logic transmits each converted electrical signal to its respective host controller (processing block 616). Finally, processing logic returns to processing block 606 to check if another signal (containing additional data/data packets) has been received.

Returning to processing block 610, if the signal has been received from the host controller then the signal is an electrical signal. Thus, processing logic proceeds to convert the electrical signal to an optical signal (processing block 618). Then processing logic, if necessary, multiplexes the converted optical signal with one or more other converted optical signals (processing block 620). Next, processing logic transmits the optical signal (either a multiplexed version or a single signal if no additional optical signals are being sent) to the peripheral device (processing block 622). Finally, processing logic returns to processing block 606 to check if another signal (containing additional data/data packets) has been received.

Thus, embodiments of a system, device, and method to implement a unified optical connector architecture on a computer platform are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A system, comprising:
 an optical link;
 a peripheral device optically coupled to the optical link;
 a first host controller;
 a unified optical connector port, optically coupled to the optical link and electrically coupled to the first host controller, the port comprising:
  a wavelength allocation unit to allocate a first optical wavelength for a first optical signal utilized to communicate with the peripheral device;
  an electrical-to-optical transmission unit to
   convert a first electrical signal received from the first host controller, to the first optical signal at the first optical wavelength; and
   transmit one or more data packets within the first optical signal to the peripheral device across the optical link.

2. The system of claim 1, wherein the unified optical connector port further comprises:
 an optical-to-electrical receiving unit to
  receive one or more additional data packets within a second optical signal, generated by the peripheral device at the same optical wavelength as the first optical signal, from the optical link;
  convert the second optical signal to a second electrical signal; and
  transmitting the second electrical signal to the first host controller.

3. The system of claim 2, wherein the unified optical connector port further comprises:

a device discovery unit to discover the peripheral device coupled to the optical link.

4. The system of claim 3, further comprising:
one or more laser transmission units, each to transmit an optical signal of a predetermined wavelength across the optical link; and
one or more photo reception units, each to receive an optical signal of a predetermined wavelength from the optical link.

5. The system of claim 4, wherein the wavelength allocation unit is further operable to power down each of the one or more laser transmission units and each of the one or more photo reception units with wavelengths that are not allocated to be utilized in the communication between the unified optical connector port and the peripheral device.

6. The system of claim 1, further comprising:
a second host controller,
wherein the wavelength allocation unit is further operable to allocate a second optical wavelength for a second optical signal utilized to communication with the peripheral device, and
wherein the electrical-to-optical transmission unit is further operable to convert a second electrical signal received from the second host controller to the second optical signal at the second optical wavelength.

7. The system of claim 6, further comprising:
a wavelength division multiplexing unit to combine the first optical signal and the second optical signal into a multiplexed optical signal,
wherein the electrical-to-optical transmission unit is further operable to transmit the multiplexed optical signal to the peripheral device across the optical link.

8. The system of claim 7, further comprising:
the peripheral device further operable to demultiplex the received multiplexed optical signal into the separate first optical signal and second optical signal;
convert the first optical signal into a corresponding electrical signal within the peripheral device; and
convert the second optical signal into a corresponding electrical signal within the peripheral device.

9. The system of claim 1, wherein the optical link comprises:
a first optical fiber for optical signal transmission from the unified optical connector port to the peripheral device; and
a second optical fiber for optical signal transmission from the peripheral device to the unified optical connector port.

10. A unified optical connector port, comprising:
a wavelength allocation unit to allocate a first optical wavelength for a first optical signal utilized to communicate with a peripheral device;
an electrical-to-optical transmission unit to
convert a first electrical signal received from a first host controller, to the first optical signal at the first optical wavelength; and
transmit one or more data packets within the first optical signal to the peripheral device across the optical link; and
an optical-to-electrical receiving unit to
receive one or more additional data packets within a second optical signal, generated by the peripheral device at the same optical wavelength as the first optical signal, from the optical link;
convert the second optical signal to a second electrical signal; and
transmit the second electrical signal to the first host controller.

11. The unified optical connector port of claim 10, wherein the unified optical connector port further comprises:
a device discovery unit to discover the peripheral device coupled to the optical link.

12. The unified optical connector port of claim 11, further comprising:
one or more laser transmission units, each to transmit an optical signal of a predetermined wavelength across the optical link; and
one or more photo reception units, each to receive an optical signal of a predetermined wavelength from the optical link.

13. The unified optical connector port of claim 10, wherein:
the wavelength allocation unit is further operable to allocate a second optical wavelength for a second optical signal utilized to communication with the peripheral device, and
the electrical-to-optical transmission unit is further operable to convert a second electrical signal received from a second host controller to the second optical signal at the second optical wavelength.

14. The unified optical connector port of claim 13, further comprising:
a wavelength division multiplexing unit to combine the first optical signal and the second optical signal into a multiplexed optical signal,
wherein the electrical-to-optical transmission unit is further operable to transmit the multiplexed optical signal to the peripheral device across the optical link.

15. A method, comprising:
converting one or more different electrical signals received from one of more integrated circuits in a computer system to one or more corresponding optical signals; and
transmitting the one of more corresponding optical signals using wavelength division multiplexing across an optical link to a peripheral device coupled to the computer system, wherein the optical link is coupled to a unified optical connector port;
determining one or more optical signals, each at a different wavelength, utilized by the peripheral device; and
the peripheral device converting at least one of the one or more received corresponding optical signals to one or more corresponding electrical signals.

16. The method of claim 15, wherein each of the one or more corresponding optical signals exists at a different wavelength than any other corresponding optical signal.

17. The method of claim 15, wherein each of the plurality of integrated circuits comprises a host controller.

18. The method of claim 17, further comprising:
discovering the peripheral device coupled to the optical link.

19. The method of claim 18, further comprising:
enabling the transmission across the optical link of only the optical signals that are utilized by the peripheral device.

20. The method of claim 17, wherein converting each of the one or more electrical signals occurs at the unified optical connector port.

21. The method of claim 17, wherein converting each of the one or more electrical signals occurs at the corresponding one or more host controllers.

* * * * *